(12) United States Patent
Smith

(10) Patent No.: US 7,604,412 B2
(45) Date of Patent: Oct. 20, 2009

(54) SELF-LUBRICATING BEARINGS

(75) Inventor: Paul Raymond Smith, Lincoln (GB)

(73) Assignee: Minebea Co. Ltd., Nagano (JP)

( * ) Notice: Subject to any disclaimer, the term of this patent is extended or adjusted under 35 U.S.C. 154(b) by 354 days.

(21) Appl. No.: 10/574,408

(22) PCT Filed: Sep. 13, 2004

(86) PCT No.: PCT/GB2004/003908

§ 371 (c)(1),
(2), (4) Date: Mar. 30, 2006

(87) PCT Pub. No.: WO2005/042993

PCT Pub. Date: May 12, 2005

(65) Prior Publication Data

US 2007/0009189 A1    Jan. 11, 2007

(30) Foreign Application Priority Data

Oct. 2, 2003   (GB) ................................ 0323095.0

(51) Int. Cl.
*F16C 23/02* (2006.01)
*F16C 33/20* (2006.01)
(52) U.S. Cl. ..................... 384/192; 384/206; 384/297; 384/908
(58) Field of Classification Search .................. 384/192, 384/206, 208, 213, 297–300, 625, 908
See application file for complete search history.

(56) References Cited

U.S. PATENT DOCUMENTS

| | | | |
|---|---|---|---|
| 3,573,926 A | | 4/1971 | Blampin |
| 4,080,015 A | * | 3/1978 | Greby et al. ................. 384/206 |
| 4,134,842 A | | 1/1979 | Orkin et al. |
| 4,200,541 A | * | 4/1980 | Kinner et al. ................ 384/912 |
| 5,660,482 A | | 8/1997 | Newley et al. |
| 6,729,763 B2 | * | 5/2004 | Post et al. .................... 384/213 |
| 2004/0022465 A1 | * | 2/2004 | Fish ............................ 384/192 |

FOREIGN PATENT DOCUMENTS

| EP | 0 452 501 A1 | 10/1991 |
|---|---|---|
| GB | 1 453 256 | 10/1976 |
| GB | 2 170 279 A | 7/1986 |
| JP | 54010769 A | 1/1979 |

OTHER PUBLICATIONS

International Search Report and Written Opinion of the International Searching Authority of PCT Application No. PCT/GB2004/003908.
Combined Search and Examination Report for Great Britain Application No. GB 0323095.0.

* cited by examiner

*Primary Examiner*—Thomas R Hannon
(74) *Attorney, Agent, or Firm*—Klarquist Sparkman, LLP

(57) ABSTRACT

A self-lubricating bearing for use in low pressure, high frequency, small amplitude applications and methods of operating and constructing the same, the bearing having a self-lubricating liner and a counterface surface in close sliding contact therewith, the counterface surface having a surface finish of less than 20 nm and a hardness of less than in the region of 1000 VPN.

20 Claims, 3 Drawing Sheets

SELF-LUBRICATING BEARINGS

This is the U.S. National Stage of International Application No. PCT/GB2004/003908, filed Sep. 13, 2004, which in turn claims the benefit of Great Britain Patent Application No. GB 0323095.0, filed Oct. 2, 2003, hereby incorporated by reference.

This invention relates to self-lubricating bearings and more particularly to self-lubricating bearings for use in low pressure or stress, high-frequency, small amplitude motion applications.

Self-lubricating bearings typically comprise a housing having a liner which is in sliding contact with a counterface. In the case of spherical bearings, the counterface comprises a ball and the housing is provided with a self-lubricating liner comprising woven or meshed fibres suffused with a resin to hold together a quantity of PTFE or other self-lubricating material. Such PTFE-rich liner systems are well-known and have been used in the past, particularly in low stress, high frequency, small amplitude motion applications for spherical bearings. The difficulties in providing self-lubricating bearings with sufficiently long life have been addressed and various solutions proposed and implemented including the approach taken in GB2170279—the resultant bearing consisting of an extremely hard counterface surface consisting of a thick and hard coating at least 50 μm thick and having a surface finish or roughness of not greater than 50 nm. GB2170279 discloses the use of surface finishes leaving a roughness in the order of 10-20 nm at best.

GB2170279 teaches the use of a counterface with both extreme hardness and smoothness. The extreme hardness is specified as being not less than 1000 VPN, with the hardness preferably being at least 1100 VPN—it should be noted that this hardness level corresponds to a tungsten carbide coated material.

Low stress, high frequency, small amplitude motion applications such as ground transport suspension systems and helicopter flying control and rotor systems have been thought for many years to require the technology disclosed in GB2170279—i.e. a bearing having a counterface of extreme hardness and smoothness. The particular thinking behind adopting the extreme hardness in the counterface is to stop debris which includes hard materials such as particles of resin from the liner and metal from the counterface from damaging the surface finish of the counterface. As soon as the surface finish of the counterface is damaged, those irregularities or rough areas further damage the liner creating more liner debris resulting in increased backlash in the bearing leading to a reduced bearing life.

The general thinking has, therefore, been that the counterface surface must be made harder than the hard debris which results in the very hard counterface surface required in GB2170279. This requirement has previously necessitated the use of thick (>50 μm) coatings which can only be machined after application. Any deviation from the characteristics specified in GB2170279, particularly with regard to the hardness and surface finish of the counterface, has therefore been regarded as unadvisable if one wishes to produce a bearing with a life comparable with that demonstrated in GB2170279 when used in low pressure or stress, high-frequency, small amplitude motion applications.

It is an object of the present invention to provide a self-lubricating liner which does not suffer from the requirement to use a counterface of extreme hardness and which provides at least comparable performance and life duration under the same operating conditions as disclosed in GB2170279.

Accordingly, one aspect of the present invention provides a self-lubricating bearing for use in low pressure, high frequency, small amplitude applications, the bearing having a self-lubricating liner and a counterface surface in close sliding contact therewith, the counterface surface having a surface finish of less than 20 nm and a hardness of less than in the region of 1000 VPN.

Preferably, the surface finish of the counterface surface is in the range of 5 nm to 20 nm.

Conveniently, the counterface surface comprises a coating on a curved surface, the curved surface having an electrolytically ground finish.

Advantageously, the coating over the electrolytically ground finish has a thickness of between 1-5 μm.

Preferably, the coating is a chemical deposition coating, a physical vapour deposition coating or an ion plating coating.

Conveniently, the bearing is a spherical bearing.

Advantageously, the spherical bearing includes a ball, the ball providing the counterface surface.

Preferably, the operating conditions, in use, are at stresses of less than 35 MPa, at a frequency of at least 0.1 Hz and with amplitudes comprising small angular motions of less than ±12° rotation.

Another aspect of the present invention provides a method of constructing a self-lubricating bearing comprising the steps of: providing a self-lubricating liner with a curved surface; providing a counterface having a curved surface; electrolytically grinding the curved surface of the counterface to a surface finish of less than 20 nm to produce a counterface surface having a hardness of less than 1000 VPN; and placing the curved surfaces of the liner and the counterface surface in sliding contact with one another.

Conveniently, the curved surfaces are correspondingly curved surfaces.

A further aspect of the present invention provides a method of operating a self-lubricating bearing having a self-lubricating liner and a counterface surface in close sliding contact therewith, the counterface surface having a surface finish of less than 20 nm and a hardness of less than 1000 VPN, wherein the operating conditions are at stresses of less than 35 MPa, at a frequency of at least 0.1 Hz and with amplitudes comprising small angular motions of less than ±12° rotation.

In order that the present invention may be more readily, understood, embodiments thereof will now be described, by way of example, with reference to the accompanying drawings, in which.

Figure 1:
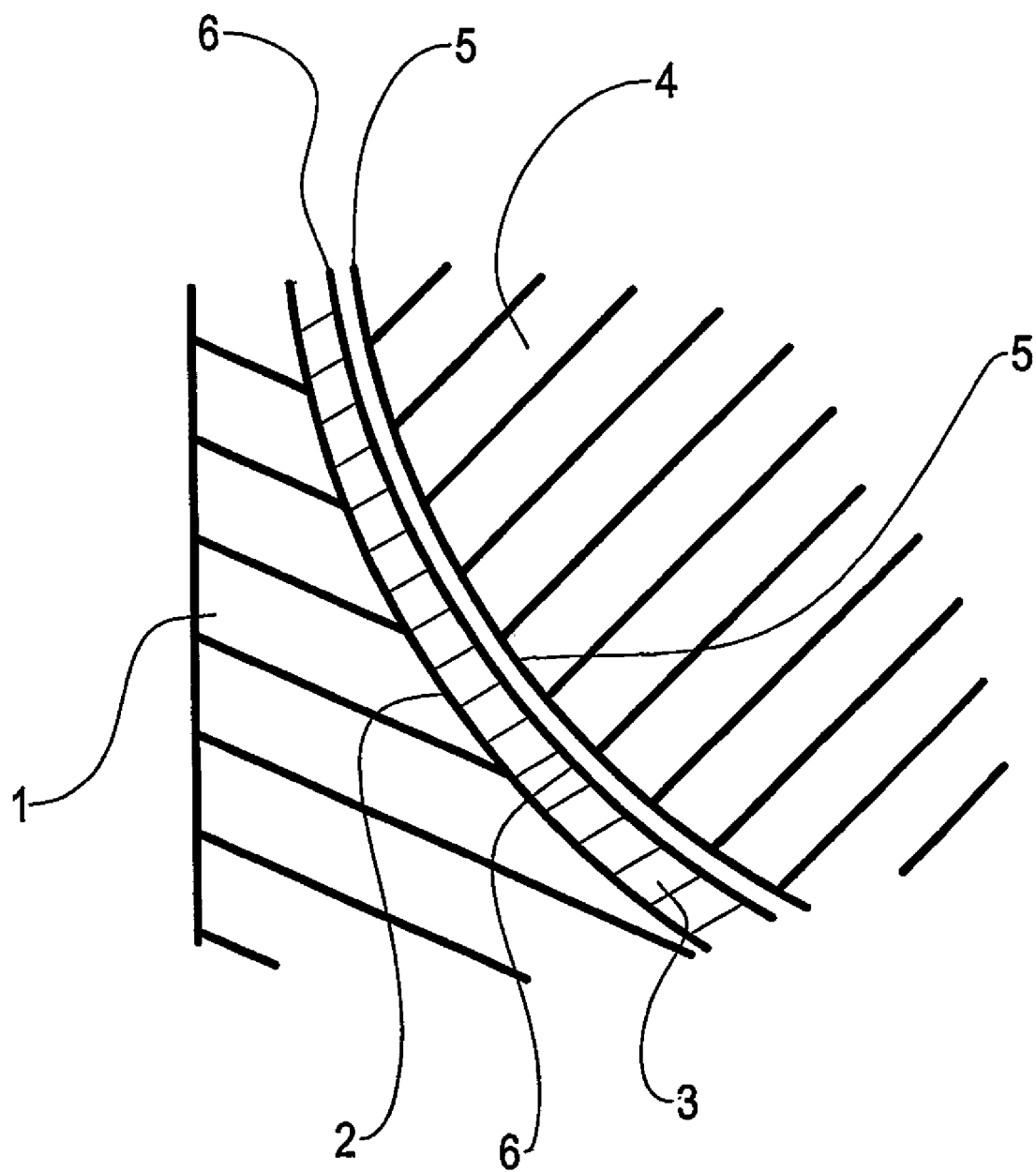
FIG. 1 is a cross-section of a detail of a self-lubricating bearing embodying the present invention.

Referring to FIG. 1, a self-lubricating spherical bearing embodying the present invention is particularly designed for use under the conditions of low pressure or stress, high-frequency and small amplitude motion. Such conditions are, more particularly: at stresses of less than 35 MPa, at a frequency of at least 0.1 Hz (helicopter applications are typically 5 to 30 Hz) and with amplitudes comprising small angular motions of less than ±12° rotation and tilt of ±5°. Such conditions are typically found in helicopter flying control and rotor systems and ground transport suspension systems. The self-lubricating spherical bearing embodying the present invention comprises a housing 1 having a spherical bearing surface 2 upon which a liner system 3 is bonded. A ball 4 having a counterface surface 5 in close contact with the liner system 3 sits in and is typically restrained in the housing. The present invention is applicable to other forms of self-lubricating bearings and not exclusively to spherical bearings. Examples of other forms of bearings having a sliding surface in sliding contact with a counterface include cylindrical journal bearings and flat contact bearings.

There is a sliding contact between the counterface 5 and the sliding surface 6 of the liner system 3.

The liner system 3 comprises a PTFE-rich self-lubricating liner system. The liner system is a low coefficient of friction liner system such as produced by NMB Minebea and consists of an enriched PTFE surface on a PTFE/Resin matrix, reinforced by a plain Nomex (Trade Mark) weave.

In direct contrast to the teaching of GB2170279, the counterface surface 5 does not have the extreme high hardness required in GB2170279. The counterface surface 5 of a preferably heat treated steel alloy ball as per AMS5630, has a hardness of 56 Rc to 62 Rc (650 to 750 VPN). Further, the counterface surface 5 is prepared to have a surface roughness in the order of 5 nm and preferably in the range of 5 nm to 20 nm.

The improved texture of the surface, the reduction in surface finish defects, in combination with the enriched PTFE surface of the liner is extremely important to the invention since it removes the requirement, hitherto thought to be essential, of extreme hardness in the counterface surface as specified in GB2170279. By adopting a surface finish in the range of 5 nm to 20 nm, it has been surprisingly found that the counterface surface 5, even when softer than the extreme hardnesses quoted in GB2170279, in combination with the liner system creates less damage to the counterface surface and so does not destroy the good surface finish of the counterface surface 5 leading to a longer life bearing.

The most preferred method of achieving the requisite surface finish in the range of 5 nm to 20 nm is by electrolytic grinding as set out in EP-A-1078714. This method has not previously been used to improve the surface finish on spherical bearings. After manufacture and using conventional bearing finishing techniques a surface finish in the region of 40 nm would be achieved whereas the electrolytic grinding method results in a much improved surface finish in the order of 5 nm to 20 nm.

A further improvement in surface finish and wear properties can be realised by utilising a coating such as a physical vapour deposition coating of between 1-5 µm over the electrolytically ground finish. Physical vapour deposition coatings could not be used with the bearing specified in GB2170279 because the necessary hardness for the coating—comprising the counterface surface—is not achievable at the low coating thicknesses produced by such deposition techniques. In contrast, because the claimed invention does not require a coating of extreme hardness, chemical or vapour deposition and ion plating techniques can be readily used. The physical vapour deposition coating gives rise to a counterface surface having a hardness in the region of 1000 VPN—still lower than the extreme hardness quoted in GB2170279.

Figure 2:
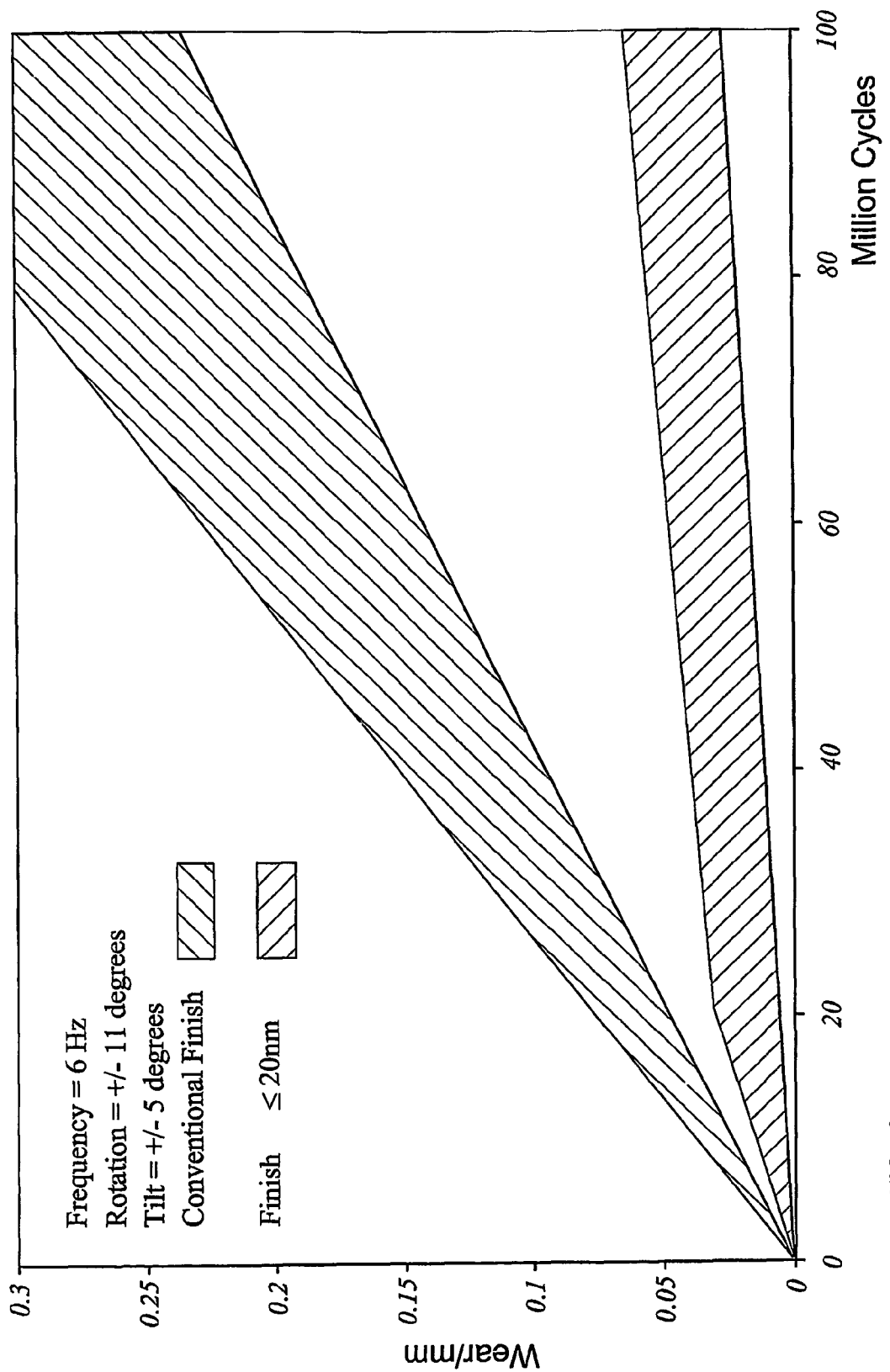
FIG. 2 is a graphical comparison of wear test results of bearings embodying the present invention and known bearings.

Test results have shown improved bearing life for bearings embodying the present invention compared to like-tests carried out on bearing surfaces without the improved surface finish of 20 nm or less. The results shown in FIG. 2 show the range of wear results achieved for two different classes of bearing—the conventional finish (in the region of 70 nm) and the finish on bearings embodying the present invention which is in the region of 5 to 20 nm.

Figure 3:
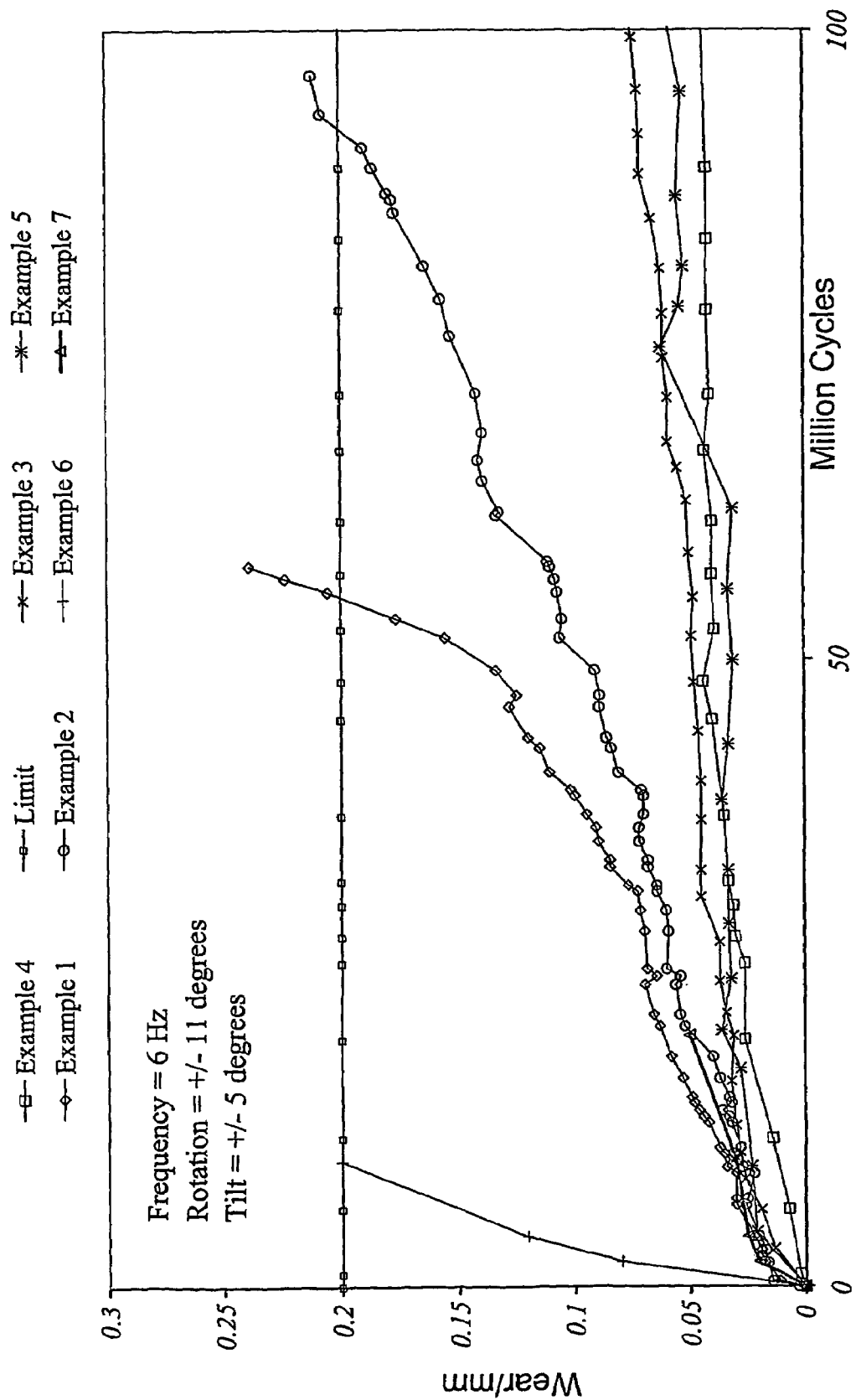
FIG. 3 is a graphical representation of wear test results of bearings embodying the present invention and known bearings.

Further, referring to FIG. 3, the wear test results are shown for the following bearings:

Example 1 comprises a bearing having a heat treated steel alloy ball as per AMS5630 having a hardness of 56 Rc to 62 Rc (650 to 750 VPN) provided with a conventional surface finish (in the region of 70 nm);

Example 2 comprises a bearing having another heat treated steel alloy ball as per AMS5630 having a hardness of 56 Rc to 62 Rc (650 to 750 VPN) provided with a conventional surface finish (in the region of 70 nm);

Example 3 comprises a bearing having a heat treated steel alloy ball as per AMS5630 having a hardness of 56 Rc to 62 Rc (650 to 750 VPN) provided with an electrolytically ground surface finish (of less than 20 nm) with no coating;

Example 4 comprises a bearing having a heat treated steel alloy ball as per AMS5630 having a hardness of 56 Rc to 62 Rc (650 to 750 VPN) provided with an electrolytically ground surface finish (of less than 20 nm) and a physical vapour deposition coating;

Example 5 comprises a bearing having another heat treated steel alloy ball as per AMS5630 having a hardness of 56 Rc to 62 Rc (650 to 750 VPN) provided with an electrolytically ground surface finish (of less than 20 nm) and a physical vapour deposition coating;

Example 6 comprises a bearing having a ball manufactured in accordance with GB2170279 with no coating; and Example 7 comprises a bearing having a ball with a tungsten carbide coating manufactured in accordance with GB2170279.

It should be noted that only Examples 3, 4 and 5 comprise embodiments of the present invention.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A self-lubricating bearing for use in low pressure, high frequency, small amplitude applications, the bearing having a self-lubricating liner and a counterface surface in close sliding contact therewith, the counterface surface having a surface finish of less than 20 nm and a hardness of less than in the region of 1000 VPN.

2. A self-lubricating bearing according to claim 1, wherein the surface finish of the counterface surface is in the range of 5 nm to 20 nm.

3. A self-lubricating bearing according to claim 1, wherein the counterface surface comprises a coating on a curved surface, the curved surface having an electrolytically ground finish.

4. A self-lubricating bearing according to claim 3, wherein the coating over the electrolytically ground finish has a thickness of between 1-5 µm.

5. A self-lubricating bearing according to claim 3, wherein the coating is a chemical deposition coating, a physical vapour deposition coating or an ion plating coating.

6. A self-lubricating bearing according to claim 1, wherein the bearing is a spherical bearing.

7. A self-lubricating bearing according to claim 6, wherein the spherical bearing includes a ball, the ball providing the counterface surface.

8. A self-lubricating bearing according to claim 1, wherein the operating conditions, in use, are at stresses of less than 35 MPa, at a frequency of at least 0.1 Hz and with amplitudes comprising small angular motions of less than ±12° rotation.

9. A method of constructing a self-lubricating bearing comprising the steps of:

providing a self-lubricating liner with a curved surface;

providing a counterface having a curved surface, wherein the curved surface of the counterface has a surface finish of less than 20 nm and a hardness of less than 1000 VPN; and placing the curved surfaces of the liner and the counterface surface in sliding contact with one another.

10. A method according to claim 9, wherein the curved surfaces are correspondingly curved surfaces.

11. A method according to claim 9, wherein the bearing is a spherical bearing comprising a ball, and the counterface is a surface of the ball.

12. A method according to claim 9, further comprising forming a coating on the curved surface of the counterface, wherein the coating provides the counterface surface in sliding contact with the liner.

13. A method according to claim 12, wherein the coating has a thickness in the range of about 1-5 µm.

14. A method according to claim 12, wherein the coating is a chemical deposition coating, a physical vapour deposition coating or an ion plating coating.

15. A method according to claim 9, wherein the counterface surface has a hardness of less than 750 VPN.

16. A method according to claim 9, wherein providing a counterface having a curved surface further comprises electrolytically grinding the curved surface.

17. A method of operating a self-lubricating bearing having a self-lubricating liner and a counterface surface in close sliding contact therewith, the counterface surface having a surface finish of less than 20 nm and a hardness of less than 1000 VPN, wherein the operating conditions are at stresses of less than 35 MPa, at a frequency of at least 0.1 Hz and with amplitudes comprising small angular motions of less than ±12° rotation.

18. A method according to claim 17, wherein the bearing is a spherical bearing comprising a ball, and the counterface surface is a surface of the ball.

19. A method according to claim 18, wherein the ball is a heat treated metal ball.

20. A method according to claim 19, wherein the ball has a physical vapour deposition coating providing the counterface surface in sliding contact with the liner.

\* \* \* \* \*